United States Patent [19]
Marshall et al.

[11] Patent Number: 5,469,297
[45] Date of Patent: Nov. 21, 1995

[54] KALEIDOSCOPE KIT

[76] Inventors: Dorothea Marshall; Ethan Allen, both of 1700 E. 56th St. - No. 3005, Chicago, Ill. 60637

[21] Appl. No.: 414,034

[22] Filed: Mar. 30, 1995

Related U.S. Application Data

[63] Continuation of Ser. No. 65,595, May 21, 1993, abandoned.
[51] Int. Cl.⁶ ................................................. G02B 23/00
[52] U.S. Cl. ........................................ 359/617; 359/616
[58] Field of Search ..................................... 359/616, 617

[56] References Cited

U.S. PATENT DOCUMENTS

| | | | |
|---|---|---|---|
| 3,884,547 | 5/1975 | Parrino | 350/4 |
| 4,231,634 | 11/1980 | Gantz et al. | 350/4.2 |
| 4,494,820 | 1/1985 | Klawitter | 350/4.1 |
| 4,762,380 | 8/1988 | MacCarthy | 350/4.1 |

OTHER PUBLICATIONS

*The Kaleidoscope*, Brewster, 1987, pp. 59–66.
*Kaleidoscope, The Art of Mirrored Magic*, Yoder, 1988, pp. 244–245.

Primary Examiner—Michael L. Gellner
Assistant Examiner—D. P. Malley
Attorney, Agent, or Firm—Dressler, Goldsmith, Shore & Milnamow, Ltd.

[57] ABSTRACT

As assembled from a kit allowing repeated assembly and at least partial disassembly without damage, a kaleidoscope comprises a tubular barrel having a proximal end and a distal end, a pair of elongate reflectors within the barrel, a sleeve mounted rotatably on the barrel, and a case rotatable conjointly with the sleeve. An annular spacer on the barrel and a ring on the sleeve coact to prevent the sleeve from being pulled from the distal end of the barrel. The case has a tubular wall, a transparent end facing the proximal end, and an at least partly transparent end facing oppositely. The case and the sleeve are assembled only with a frictional interfit between the tubular wall and the end portion so as to permit the case, as a unit, and the sleeve to be repeatedly assembled and disassembled without damage.

8 Claims, 2 Drawing Sheets

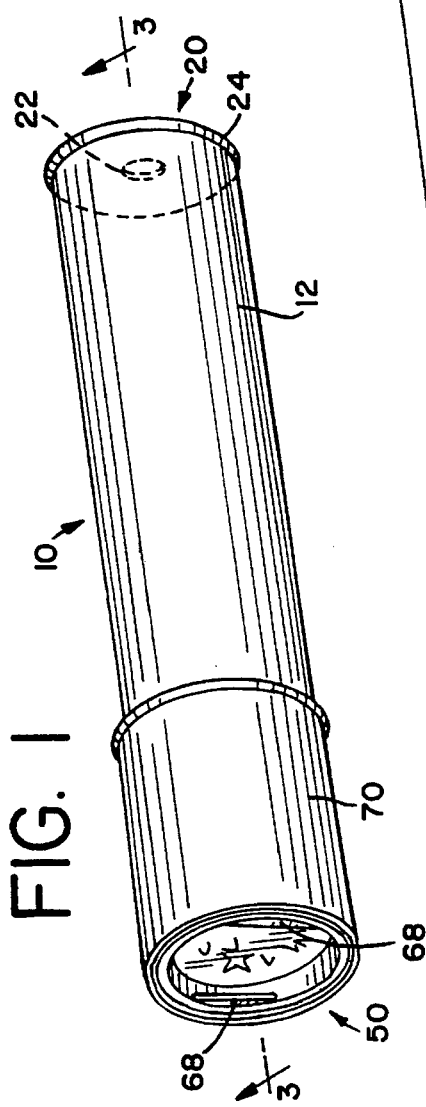
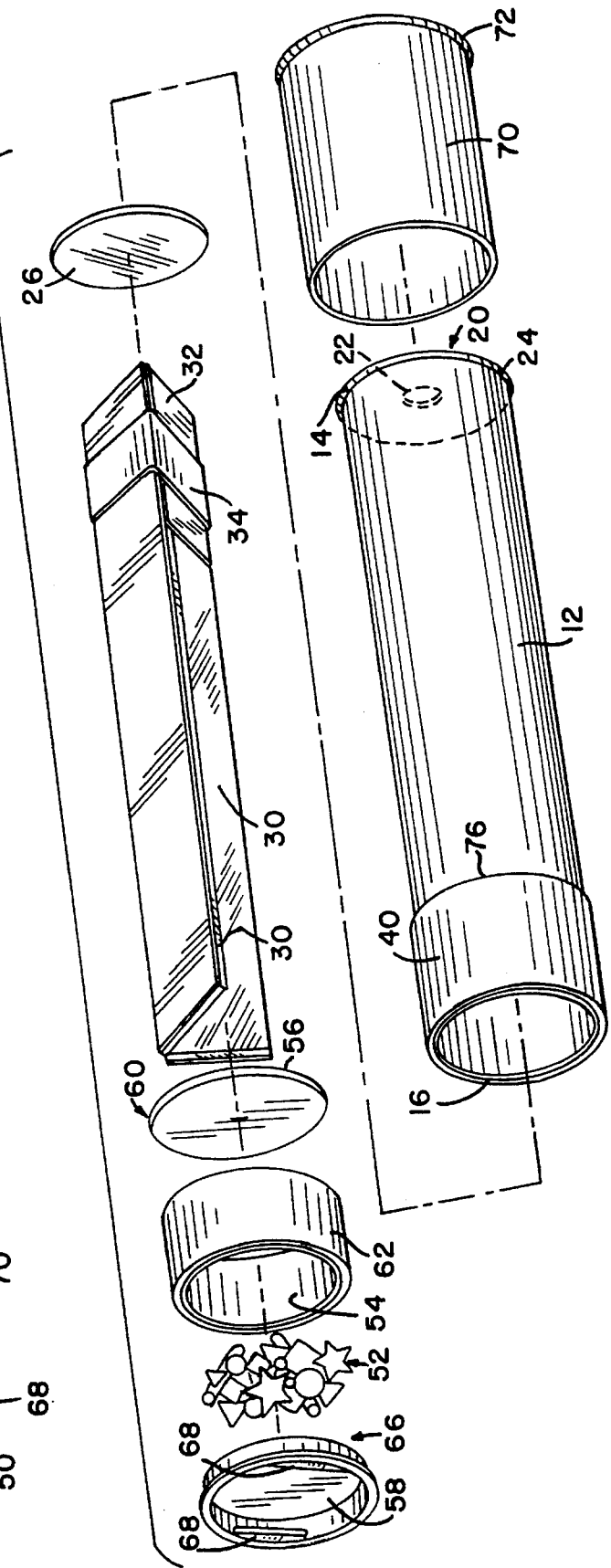

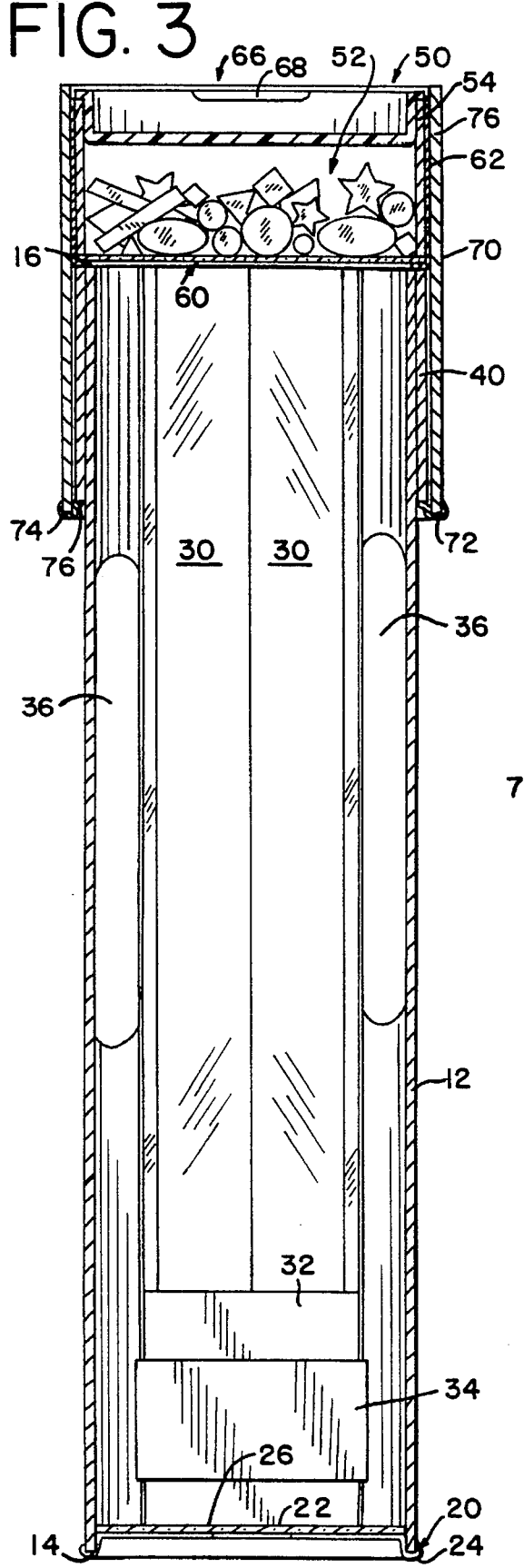
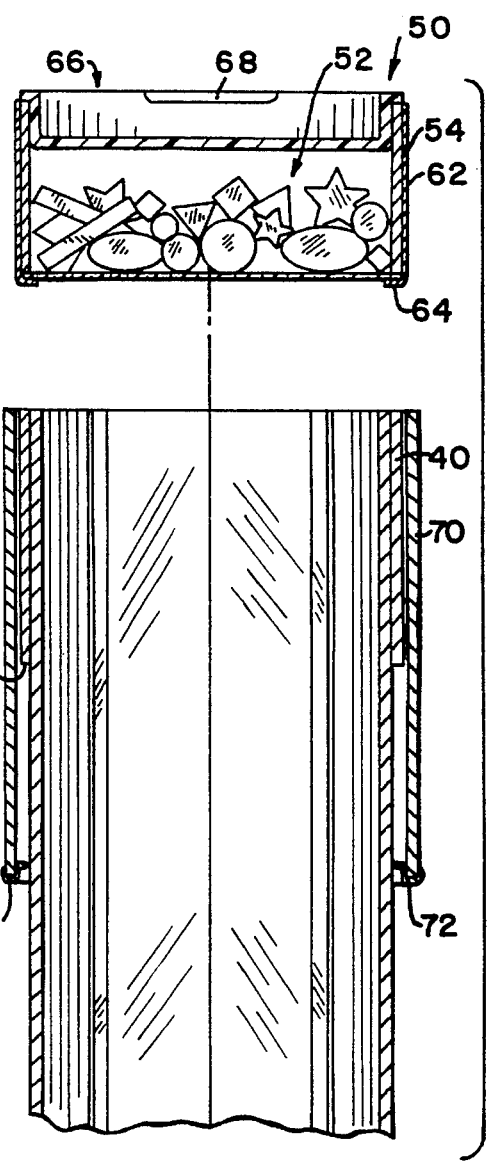

5,469,297

KALEIDOSCOPE KIT

This is a continuation of application Ser. No. 08/065,595, filed May 21,1993, now abandoned.

TECHNICAL FIELD OF THE INVENTION

This invention pertains to a kaleidoscope, which is assembled from a kit. A case designed to hold videnda and a sleeve mounted rotatably on a tubular barrel, within which elongate reflectors extend, are assembled only with a frictional interfit allowing the case, as a unit, and the sleeve to be repeatedly assembled and disassembled without damage.

BACKGROUND OF THE INVENTION

Dating back to the kaleidoscope patented by Sir David Brewster in 1817, kaleidoscopes have fascinated countless persons, both children and adults.

Commonly, a kaleidoscope comprises a tubular barrel, which may include an eyepiece at a proximal end, two or more elongate reflectors extending along and within the barrel, and a case, which is designed to hold videnda and which is mounted to the barrel, at a distal end of the barrel. Videnda, literally that which should be viewed, most commonly are small glass or plastic beads in air or in a liquid, small ampoules containing colored liquids, or other similar or dissimilar objects.

In a simple form, the kaleidoscope is rotatable as a unit including the videnda or object case and the barrel. In a variant form, the videnda or object case is mounted to an outer sleeve, which is mounted rotatably on the distal end of the barrel, so that the case and the sleeve can be conjointly rotated while the barrel is being held. Rotation of the case and the barrel in the simple form or rotation of the case and the sleeve in the variant form causes the images to change dynamically.

As a medium for education in physics, mathematics, and practical arts as well as for entertainment, a kit allowing a kaleidoscope to be repeatedly assembled and at least partially disassembled without damage would be well received by those who enjoy building kaleidoscopes and teaching others to use, build, and enjoy them.

SUMMARY OF THE INVENTION

This invention provides a simple but elegant kaleidoscope, which is assembled from a kit allowing repeated assembly and at least partial disassembly without damage.

Broadly, the kaleidoscope provided by this invention comprises a tubular barrel having a proximal end and a distal end, at least two elongate reflectors extending within the barrel, approximately between the proximal and distal ends, a sleeve mounted rotatably on the barrel and having an end portion extending beyond the barrel, and a case mounted to the end portion of the sleeve so as to be conjointly rotatable with the sleeve.

The case, which can hold videnda, has a tubular wall, a transparent end facing the proximal end of the barrel, and an at least partly transparent end, preferably translucent, which faces oppositely. The case and the sleeve are assembled only with a frictional interfit permitting the case, as a unit comprising the tubular wall and the oppositely facing ends, and the sleeve to be repeatedly assembled and disassembled without damage.

Moreover, the sleeve is mounted on the barrel in a manner preventing the sleeve from being pulled accidentally from the barrel if the sleeve is pulled toward the distal end of the barrel, while the barrel is held, but permitting the sleeve to be pulled toward the proximal end of the barrel, while the barrel is being held, so as to separate the case from the sleeve.

Preferably, the tubular wall of the case is fitted into the end portion of the sleeve, beyond the distal end of the barrel. Thus, the frictional interfit between the tubular wall of the case and the end portion of the sleeve enables the case and the sleeve to be conjointly rotated on the barrel. Also, the frictional interfit therebetween prevents the case from dropping accidentally from the sleeve if the kaleidoscope is held vertically with the distal end below the proximal end. Further, the frictional interfit therebetween prevents the sleeve from dropping accidentally along the barrel, toward the proximal end, if the barrel is held oppositely. Moreover, the frictional interfit therebetween permits the case, as a unit comprising the tubular wall and the oppositely facing ends, to be repeatedly attached and removed from the sleeve without damage.

In a preferred embodiment, an annular spacer is secured to the barrel, near the distal end, and a ring is secured to the sleeve, near one end of the sleeve. Thus, the sleeve fits rotatably around the annular spacer, beyond the ring. Also, the ring fits rotatably around the barrel, at a location where the ring does not interfere with the spacer. The ring coacts with the annular spacer to prevent the sleeve from being pulled accidentally from the barrel if the sleeve is pulled toward the distal end of the barrel.

If the tubular wall of the case and the annular spacer are made from a common piece of tubular stock, the tubular wall of the case may be wrapped with a wrapping material, such as adhesive tape, which provides the frictional interfit noted above. The wrapping material may be also used to secure the transparent end of the case to the tubular wall of the case. The at least partly transparent end of the case may be secured to the tubular wall thereof only with a frictional interfit permitting the at least partly transparent end to be repeatedly attached and removed from the tubular wall without damage.

Moreover, the kaleidoscope may comprise an end piece defining a viewing aperture and closing the proximal end of the barrel except for the viewing aperture. Preferably, a transparent disc is disposed within the barrel to separate the reflectors from the end piece.

These and other objects, features, and advantages of this invention are evident from the following description of a preferred embodiment of this invention with reference to the accompanying drawings.

BRIEF DESCRIPTION OF THE DRAWINGS

FIG. 1 is a perspective view of a kaleidoscope embodying this invention, as assembled from a kit allowing repeated assembly and partial disassembly without damage.

FIG. 2 is an enlarged, exploded view of a tubular barrel, a sleeve, a videnda or object case, and other components of the kit, in a substantially disassembled state.

FIG. 3 is a further enlarged, sectional view taken along line 3—3 of FIG. 1, in a direction indicated by arrows.

FIG. 4 is a fragmentary, sectional view taken similarly but showing the sleeve being pulled along the barrel, in a direction indicated by an arrow, so as to separate the case from the sleeve for partial disassembly of the kaleidoscope.

DETAILED DESCRIPTION OF PREFERRED EMBODIMENT

As shown in FIG. 1 and other views, a kaleidoscope 10 constituting a preferred embodiment of this invention is assembled from a kit allowing repeated assembly and partial disassembly without damage.

The kaleidoscope 10 comprises a tubular barrel 12, which may be advantageously made from tubular stock of suitable inner and outer diameters, such as a conventional mailing tube made from wound paper. The barrel 12 may be suitably decorated on its outer surface. As indicated in FIG. 2, it is convenient to refer to the opposite ends of the barrel 12 as the proximal end 14 and the distal end 16.

An end piece 20 made of thin metal, such as steel, defines a viewing aperture 22, which is circular. The end piece 20 is crimped around its peripheral edge 24 to secure the end piece 20 to the proximal end 14 of the barrel 12. The end piece 20 closes the proximal end 14 except for the viewing aperture 22. A transparent disc 26, which may be made of any suitable plastic, is disposed within the barrel 12, against the end piece 20.

The kaleidoscope 10 comprises a pair of elongate, rectangular reflectors 30, which may be glass mirrors, polished metal strips, or polished acrylic reflectors, which are preferred. The reflectors 30 are arranged to define a dihedral angle, preferably 45°. Near one end of the pair of reflectors 30, the reflectors 30 are braced by a rectangular, cardboard brace 32, which is secured to the reflectors 30 by adhesive tape 34.

The braced reflectors 30 are inserted into the barrel 12, so that the brace 32 is near the transparent disc 26, and so that the braced reflectors 30 extend approximately between the proximal and distal ends of the barrel 12. As shown in FIG. 3, the braced reflectors 30 are stabilized within the barrel 12, against the transparent disc 26, by pieces 36 of cotton padding, crumpled paper toweling, foamed polystyrene, or other generally compressible material. Crumpled paper toweling is preferred.

An annular spacer 40, which may be advantageously made from tubular stock of suitable inner and outer diameters, such as a conventional mailing tube made from wound paper, is fitted over the barrel 12, near the distal end 16, with a frictional interfit securing the spacer 40 to the barrel. Tape (not shown) wound around the barrel 12 may be used to provide the frictional interfit between the spacer 40 and the barrel 12.

A case 50 is provided for holding assorted videnda 52, such as colored, translucent, plastic beads, paper clips, small pieces of colored plastic foil, and other small objects. The case 50 comprises a tubular wall 54, a transparent end 56, and a translucent or partly transparent end 58.

The tubular wall 54 may be advantageously made from tubular stock of a suitable, such as a conventional mailing tube made from wound paper. The tubular wall 54 and the annular spacer 40 may be advantageously made from the same piece of tubular stock.

The transparent end 56 is defined by a transparent disc 60, which is made from a suitable, clear plastic. The disc 60 is secured to the wall 54 by adhesive tape 62 wrapped around the wall 54. One edge 64 of the tape 62 is folded inwardly over the disc 60. The translucent end 58 is defined by a mailing tube plug 66, which has a conventional shape, and which is made from a suitable, translucent plastic. The plug 66 is fitted into the tubular wall 54 with a frictional fit permitting the plug 66 to be repeatedly attached to and removed from the wall 54 without damage. Flanges 68 on the plug 66 facilitate its removal from the wall 54. Such flanges are often provided conventionally on mailing tube plugs.

A sleeve 70 is provided, which may be advantageously made from tubular stock of suitable inner and outer diameters, such as a conventional mailing tube made from wound paper. The sleeve 70 may be suitably decorated on its outer surface. A ring 72 made of thin metal, such as steel, is crimped to one end of the sleeve, namely the end 74 nearer to the proximal end 14 of the barrel 12. Once crimped thereto, there is no need for the ring 72 to be later disassembled from the sleeve 70.

The sleeve 70 fits loosely and rotatably around the annular spacer 40, beyond the ring 72. The ring 72 fits loosely and rotatably around the barrel 12, at a location where the ring 72 does not interfere with the spacer 40. The ring 72 coacts with one end of the spacer 40, namely the end 76 nearer to the proximal end 14 of the barrel 12, to prevent the sleeve 70 from being pulled from the barrel 12 if the sleeve 70 is pulled toward the distal end 16 of the barrel 12.

As shown in FIG. 3, the sleeve 70 has an end portion 78 extending beyond the distal end 16 of the barrel 12. The tubular wall 54 of the case 50 is fitted into the end portion 78. The tape 62 wrapped around the tubular wall 54 of the case 50 increases the outer diameter of the case 50, as compared to the outer diameter of the annular spacer 40, so as to provide a frictional interfit between the case wall 54 and the end portion 78.

Thus, the frictional interfit between the case wall 54 and the end portion 78 of the sleeve 70 enables the case 50 and the sleeve 70 to be conjointly rotated on the barrel 12. Also, the frictional interfit therebetween prevents the case 50 from dropping accidently from the sleeve 70 if the barrel 12 is held vertically with the distal end 16 below the proximal end 14. Further, the frictional interfit therebetween prevents the sleeve 70 from dropping accidently along the barrel 12, toward the proximal end 14, if the barrel 12 is held oppositely. Moreover, the frictional interfit therebetween permits the case 50, as a unit comprising the case wall 54 and the case ends 56, 58, to be repeatedly attached to and removed from the sleeve 70 without damage.

When it is desired to remove the case 50 from the sleeve 70, it is necessary merely to hold the barrel 12 and to pull the sleeve 70 toward the proximal end 14 of the barrel 12, as shown in FIG. 4. Once the case 50 has separated from the sleeve 70, the reflectors 30, the stabilizing pieces 36, and the transparent disc 26 can be then removed for repair, cleaning, or replacement.

The kaleidoscope 10 may be advantageously provided as a kit comprising the barrel 12 and the end piece 20, as a subassembly, and the sleeve 70 and the ring 72, as another subassembly, together with the annular spacer 40, the transparent disc 26, the reflectors 30, the brace 32, the case wall 54, the transparent disc 60, the plug 66, assorted videnda 52, as separate components, and together with suitable adhesive tape for the tape 34 and for the tape 62. Common masking tape or adhesive tape of another type that does not adhere aggressively to other paper and plastic parts used in the kit is suitable. The kit permits the kaleidoscope 10 to be repeatedly assembled and partly disassembled without damage. A need for more tape for reassembly of the kaleidoscope 10 is not regarded as damage.

One possible modification of the kaleidoscope would be to replace the plug 66 with a translucent or transparent disc (not shown) held in place on the case wall 54 by the tape 62 as the transparent disc 60 is secured or by an annular retainer (not shown) fitted into the sleeve 70 with a frictional interfit. Another possible modification would be to replace the metal ring 72 with an annular spacer (not shown) made from tubular stock of suitable inner and outer diameters, such as the stock used to make the annular spacer 40 and the case wall 54, fitted into the sleeve 70, near the end 76, and secured adhesively to the sleeve 70.

Various other modifications may be made in the preferred embodiment described above without departing from the scope and spirit of this invention.

We claim:

1. A kaleidoscope assembled from a kit allowing repeated assembly and at least partial disassembly by a user, the kaleidoscope comprising (a) a tubular barrel having a proximal end and a distal end,
   (b) at least two elongate reflectors extending within the barrel, approximately between the proximal and distal ends of the barrel, each reflector having a proximal end toward the proximal end of the barrel and a distal end toward the distal end of the barrel,
   (c) a sleeve mounted rotatably on the barrel, the sleeve having an end portion extending beyond the distal end of the barrel,
   (d) a removable case containing videnda and assembled from a tubular wall, a transparent end, and an at least partly transparent end, the case being mounted removably to the end portion of the sleeve so that the tubular wall is fitted into the end portion of the sleeve with a frictional interfit such that the case as a unit comprising the tubular wall and the transparent and at least partly transparent ends and containing videnda rotates conjointly with the sleeve, so that the transparent end faces and covers the distal end of each of the reflectors, and so that the at least partly transparent end faces oppositely, wherein the assembled case is removable from the sleeve, as a unit comprising the tubular wall and the transparent and at least partly transparent ends and containing videnda, so as to expose the reflectors for repair, cleaning, or replacement without requiring or resulting in disassembly of either the transparent end or the at least partly transparent end from the tubular wall of the case.

2. The kaleidoscope of claim 1 further comprising an annular spacer secured to the barrel, near the distal end of the barrel, and a ring secured to the sleeve, near one end of the sleeve, the sleeve fitting rotatably around the annular spacer, beyond the ring, the ring fitting rotatably around the barrel, at a location where the ring does not interfere with the annular spacer, the ring coacting with the annular spacer to prevent the sleeve from being pulled accidentally from the barrel if the sleeve is pulled toward the distal end of the barrel.

3. The kaleidoscope of claim 1 wherein the tubular wall of the case is wrapped with a wrapping material providing the frictional interfit between the tubular wall of the case and the end portion of the sleeve.

4. The kaleidoscope of claim 3 wherein the wrapping material secures the transparent end of the case to the tubular wall of the case.

5. The kaleidoscope of claim 4 wherein the wrapping material is adhesive tape.

6. The kaleidoscope of claim 1 wherein the at least partly transparent end of the case is secured to the tubular wall of the case only with a frictional interfit permitting the at least partly transparent end to be repeatedly attached to and removed from the tubular wall of the case.

7. The kaleidoscope of claim 1 further comprising an end piece defining a viewing aperture, the end piece covering the proximal end of the barrel except for the viewing aperture.

8. The kaleidoscope of claim 7 further comprising a transparent disc disposed within the barrel to separate the proximal ends of the reflectors from the end piece.

* * * * *